US010933347B2

(12) United States Patent
Camilleri et al.

(10) Patent No.: US 10,933,347 B2
(45) Date of Patent: Mar. 2, 2021

(54) APPARATUS AND METHOD FOR SEPARATING PLANT TRICHOMES USING A DOUBLE VORTEX TURBULENCE

(71) Applicant: DELTA SEPARATIONS, LLC, Cotati, CA (US)

(72) Inventors: Didier Camilleri, El Cerrito, CA (US); Benjamin K. Stephens, Santa Rosa, CA (US)

(73) Assignee: Delta Separations, LLC, Cotati, CA (US)

( * ) Notice: Subject to any disclaimer, the term of this patent is extended or adjusted under 35 U.S.C. 154(b) by 0 days.

(21) Appl. No.: 16/103,972

(22) Filed: Aug. 16, 2018

(65) Prior Publication Data

US 2019/0054393 A1    Feb. 21, 2019

Related U.S. Application Data

(60) Provisional application No. 62/547,600, filed on Aug. 18, 2017.

(51) Int. Cl.
*B01D 11/02* (2006.01)

(52) U.S. Cl.
CPC ............... *B01D 11/0257* (2013.01)

(58) Field of Classification Search
CPC .................................. B01D 11/0257
See application file for complete search history.

(56) References Cited

U.S. PATENT DOCUMENTS 6,158,591 A * 12/2000 Delp ............... B01D 11/0257
                                                         209/17
9,050,631 B2    6/2015 Raichart

FOREIGN PATENT DOCUMENTS

CN    104745472 A  *  7/2015
CN    205340617 U  *  6/2016

* cited by examiner

*Primary Examiner* — Waqaas Ali
(74) *Attorney, Agent, or Firm* — Dickinson Wright, PLLC; Michael E. Noe, Jr.

(57) ABSTRACT

A method and apparatus for separating trichome heads containing resin from cannabis plants using a double vortex liquid flow to remove the trichome heads without macerating the plant material and a multi-tiered filtration process to isolate the resin product.

3 Claims, 4 Drawing Sheets

APPARATUS AND METHOD FOR SEPARATING PLANT TRICHOMES USING A DOUBLE VORTEX TURBULENCE

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The present invention relates generally to separating sticky particulate from plant material. More specifically, the present invention relates to separating resin heads from cannabis plants.

2. Description of the Related Art

Hashish is a consumable compress of purified psychoactive resin from the glandular trichomes of the cannabis plant. The trichomes are found on the flowers, and to a lesser extent, in the stems and leaves of the plant. Historically, separating the trichomes from the plant has been very difficult as the resin within the trichomes is quite sticky. Methods such as flat screening or dry sieving require practice and skill, are inefficient, and often result in a lower quality product that contains broken leaf-matter contaminants. Use of chemical solvents can alter the resin and produce unwanted by-products. Machines, such as that disclosed by Raichart in U.S. Pat. No. 9,050,631, which tumble the plant flowers and collect the sticky trichomes on sieving screens, although inexpensive, are also inefficient, and are difficult to clean and reuse.

Some success has been found with a process using ice, water, and a mechanical agitator. The ice reduces the stickiness of the resin in the trichome heads, and the mechanical agitator forces the trichome heads to break away from their stalks and botanical material. In addition, the use of ice and mechanical agitators on the botanical material creates plant particulate contamination in the final resin product, creating an inferior product and harsh flavors.

An example of an ice and agitator method is the cold water cleaning process and machine disclosed by Reinhard in U.S. Pat. No. 6,158,591. This machine uses an agitator similar to an electric mixer that macerates the leaves of the plant, damaging them before the resin can be removed. The machine requires the use of ice to keep the water as cold as possible, but the ice also damages the plant material, resulting in inefficiencies in the process. The machine also contains internal screens which are easily blocked by sticky resin and plant biomass, making them ineffective and preventing effective flow of liquid through the machine.

The present invention addresses these issues by combining a low temperature process with a double vortex pattern of liquid flow to gently remove the resin heads from the botanical material. The double vortex flow is created through a uniquely shaped basin in combination with a user controlled rotator plate. The double vortex flow results in a gentle, yet powerful, turbulence. The rolling effect of this turbulence gently removes the cold-water hardened trichome heads from their stalks, yielding a much cleaner and desirable end product. A subsequent filtration process is used to separate the resin containing trichome heads from the liquid. The filtration system uses a series of different sized filters to separate elements of the plant's biomass contaminants from the trichome heads. The result is a maximum separation of the resin containing trichome heads from the plant surface with negligent to non-existent contamination.

BRIEF SUMMARY OF THE INVENTION

The present invention is a method and apparatus that separates trichome heads from plants using a double vortex liquid flow to separate the trichomes from the leaves, flowers, and stems. The plant parts are placed with very cold liquid in a jacketed basin which contains a rotator plate near the bottom. The shape of the basin is circular on the front half, and a rounded square on the back half. The plant biomass is soaked in this cold liquid bath until fully hydrated, such that all plant components are completely softened and any flowers begin to open.

Following hydration, the user starts the rotator plate spinning, creating a central vortex. As the liquid swirls and picks up speed, the outer edge of the liquid flow rolls off the back side of the rounded square portion of the basin and rolls over the mid-section of the liquid flow, creating a powerful, rolling turbulence in a second vortex. After establishing this second vortex, the direction of rotation of the rotator plate is reversed, causing more gentle turbulence as the liquid flow reverses direction. When the double vortexes are created in the opposite direction, the rotator plate is again reversed to repeat the process. Each time the rotator plate direction is reversed, the velocity is increased to increase the power of the turbulence.

The liquid and separated plant biomass and trichome head resin material are evacuated from the basin through a Venturi style drain which creates a powerful flow of liquid toward the external filtration system. That powerful flow is necessary to ensure the separated plant biomass and sticky trichome head resin material do not get trapped in the drain.

The filtration system employs a series of different sized external filters to separate elements of used plant biomass, trichome head resin material, and contaminants. The first filter is designed to capture plant components that have passed through the drain and are not fully cleaned of resin. The plant components captured in this first filter may be removed and returned to the basin for further resin separation. The second filter catches the smallest botanical particles while allowing the resin components to pass through. Some resin particulate may remain with the plant material on the second filter and it may be removed and rinsed with high pressure water spray to capture more of the resin product. The final filter is designed to capture the resin product which is then removed from the filter for further processing.

BRIEF DESCRIPTION OF THE SEVERAL VIEWS OF THE DRAWINGS

A more complete understanding of the present invention may be derived by referring to the detailed description and claims when considered in connection with the figures, wherein like reference numbers refer to similar items throughout the figures and:

DETAILED DESCRIPTION OF THE INVENTION

In the following detailed description of the invention, reference is made to the accompanying drawings which form a part of the disclosure and, which show by way of illustration, and not of limitation, specific embodiments by which the invention may be practiced. The drawings, the foregoing discussion, and the following description are exemplary and explanatory only, and are not intended to limit the scope of the invention or its application in any manner.

Figure 1:
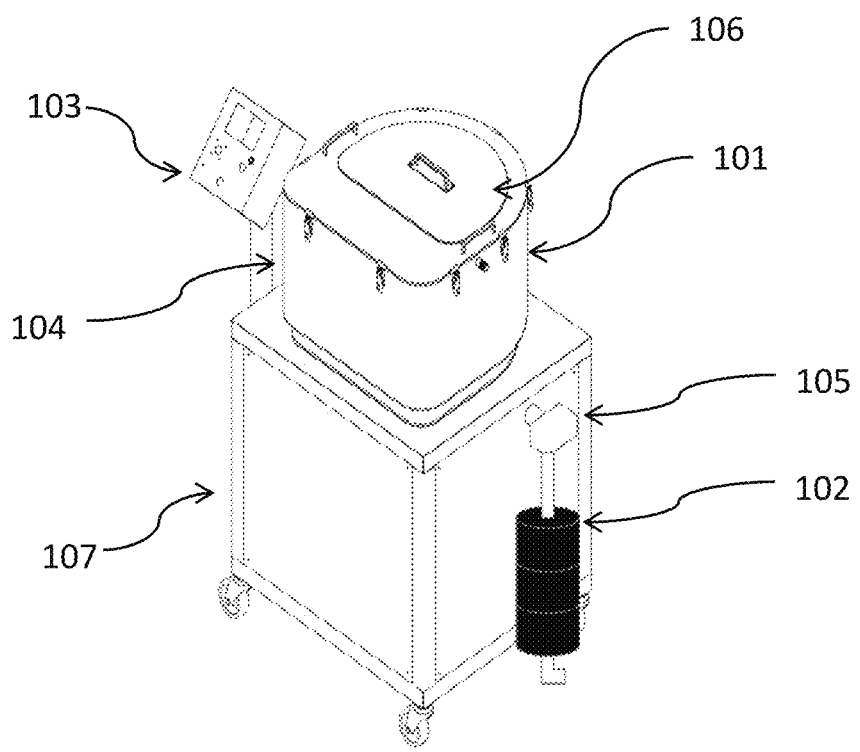
FIG. 1 is a perspective view of the exterior of the Double Vortex Machine showing the exterior of the Basin on a Cart, the Outflow Pipe and Valve, and the Multi-Tiered Filter Assembly.

The apparatus of the present invention is a Double Vortex Machine 101 and a Multi-Tiered Filter Assembly 102, used in conjunction with a liquid source. FIG. 1 shows one possible embodiment of the invention as installed conveniently on an optional Cart 107. The liquid is preferably water, and the source may be a food-grade water hose with a high pressure spray nozzle attached. In another embodiment, the Double Vortex Machine 101 may also be hard plumbed to a water or other liquid source. The Double Vortex Machine 101 has a uniquely shaped Basin 104, a Rotator Plate 201, a Motor 302, a Control Unit 103, a Venturi Drain 202, and an Outflow Pipe Assembly 105. The Multi-Tiered Filter Assembly 102 is attached to the Outflow Pipe Assembly 105 and includes a series of removable Filters 305, 306, and 307. The attributes of each element of the assembly are described throughout the following description of the extraction process.

Figure 2:
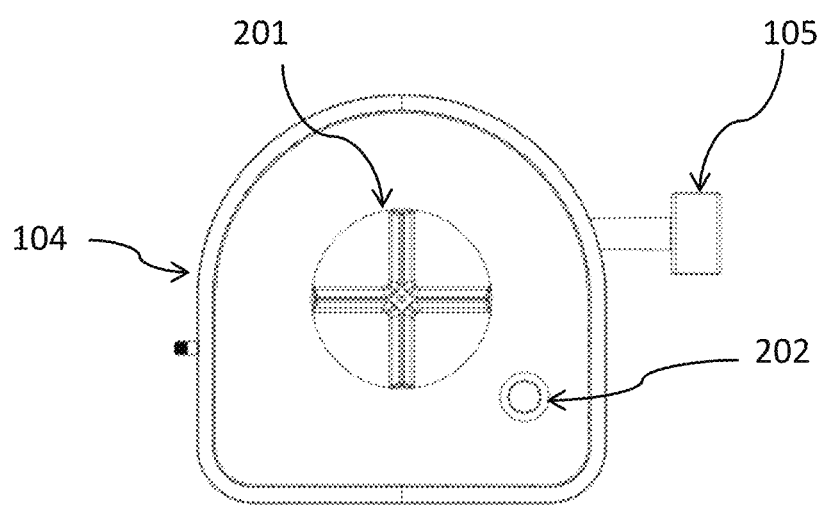
FIG. 2 is a view of the top of the Double Vortex Machine without a Cover or a Cart and showing the interior shape, the Rotator Plate and the location of the Venturi drain.
Figure 3:
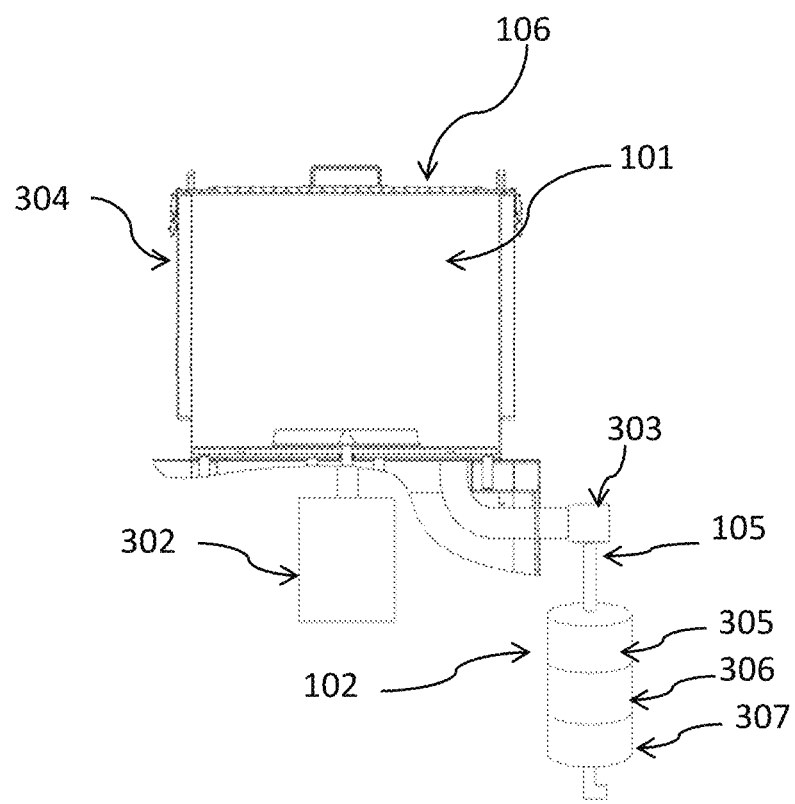
FIG. 3 is a cross section of the Double Vortex Machine showing the Jacketing, a possible shape of the Rotator Plate, the location of the Motor and the Multi-Tiered Filter Assembly showing three Filters.

The process begins with hydration of the plant product in the Basin 104 of the Double Vortex Machine 101. As shown in FIG. 2, the Basin 104 is shaped such that the front half is a semi-circle and the back half is a rounded square. The distance from the center of the semi-circle to the flat portion of the rounded square is preferably equal to, or just slightly larger, than the radius of the semi-circle. The Basin 104 is preferably made of stainless steel to prevent the resin from sticking to the surface and to facilitate cleaning, but it may be made of any other suitable material. The Basin 104 is also preferably jacketed as shown in FIG. 3, and may have a Cover 106 as shown in FIGS. 1 and 3, to help maintain the liquid temperature at close to freezing.

A Venturi Drain 202, located in the bottom of the Basin 104, is connected to the Outflow Pipe Assembly 105 which includes a Valve 303. The Valve 303 is preferably manually operated, but may also be electrically connected to, and controlled by, the Control Unit 103. With the Valve 303 in the closed position, the Basin 104 is filled approximately two thirds full with very cold liquid, preferably water. If a cold liquid source is not available, the temperature of the liquid may be reduced to near zero degrees Celsius via the introduction of coolant to the Jacketed Portion 304 of the Basin 104, if the Basin 104 is jacketed. The plant product is placed in the Basin 104 with the very cold liquid and is soaked in this bath until all elements are fully hydrated and any flowers begin to open.

The Rotator Plate 201, located at the geometric center of the Basin 104, is positioned slightly above the bottom of the Basin 104 such that there is sufficient clearance beneath the Rotator Plate 201 to ensure plant material does not become trapped underneath. The shape of the Rotator Plate 201 is preferably fairly flat with several ribs of sufficient height to move the liquid into a First Vortex 401 when it is rotated, as shown by the arrows in FIG. 4. The Rotator Plate 201 is preferably made of stainless steel, but may be made of any suitable material. The Rotator Plate 201 is connected mechanically to a Motor 302 which is connected electrically to the Control Unit 103. The Motor 302 has variable speed capability, preferably from 300 to 1700 rpm, which may be adjusted by the user through the Control Unit 103. The Control Unit 103 is preferably designed to automatically reverse the Motor 302 direction at intervals based on the adjusted speed, but this reversal may also be done manually by the user. The Motor 302 and Control Unit 103 components are all readily available catalogue items, and no particular model(s) or specifications are indicated.

Figure 4:
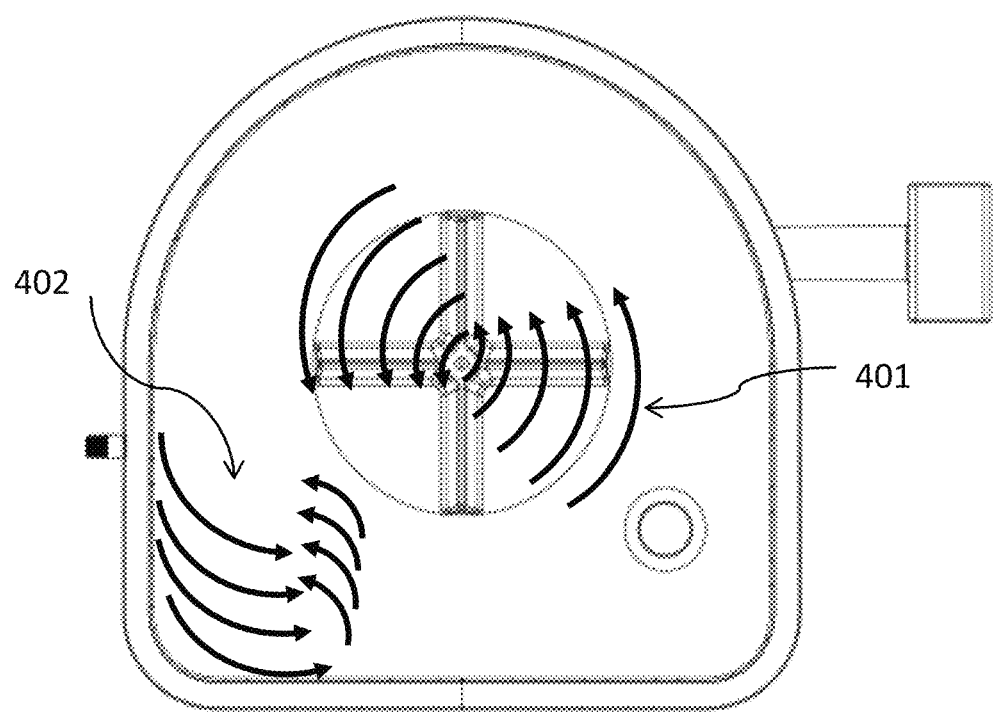
FIG. 4 is a schematic showing the liquid flows in the First and Second vortexes when the Rotator Plate is spinning in the clockwise direction.

After hydration of the plant product is complete, the user starts the Rotator Plate 201 spinning using the Control Unit 103. The spinning of the Rotator Plate creates a First Vortex 401 in the Basin 104. As the liquid swirls and picks up speed, the outer edge of the liquid flow rolls off the back side of the rounded square portion of the Basin 104 and rolls over the mid-section of the liquid flow, creating a Second Vortex 402 as shown in FIG. 4. After establishing this Second Vortex 402, the direction of rotation of the Rotator Plate 201 is reversed, either automatically through design of the Control Unit 103, or manually by the user. The reversal action creates more turbulence as the liquid flow reverses direction. Ultimately, double vortexes are created in the opposite direction, and the user, or the Control Unit 103, reverses the Rotator Plate 201 direction again to repeat the process.

Each time the Rotator Plate 201 direction is reversed, the velocity is preferably increased to increase the power of the turbulence. The increase in velocity is preferably manually adjusted by the user, but it may also be automated in the Control Unit 103.

After a sufficient amount of trichome heads containing resin have been separated from the plant material, the Rotator Plate 201 rotation is stopped and the filtering portion of the process is started. The Valve 303 in the Outflow Pipe Assembly 105 is opened and the liquid, processed plant biomass and separated trichome heads containing the resin flow through the Venturi Drain 202 to the Multi-Tiered Filter Assembly 102. The Valve 303 is preferably manually operated, but may also be an electronically controlled and operated valve, such as a solenoid. If an electronically controlled valve is used, it would preferably be electrically connected to, and operated by, the Control Unit 103.

The Multi-Tiered Filter Assembly 102 contains at least two, and preferably three, removable Filters 305, 306, and 307. The First Filter 305, preferably with a mesh size of approximately 190 microns, is sized to capture plant components that have passed through the drain and are not fully cleaned of resin. The plant components captured in this First Filter 305 may be removed and returned to the basin for further resin separation. The Multi-Tiered Filter Assembly 102 preferable contains a Middle Filter 306 with a mesh size of approximately 160 microns that will capture both trichome heads containing resin material and plant biomass of a similar size. Some resin particulate may remain with the plant material on the Middle Filter 306, and it may be removed and rinsed with high pressure water spray to capture more of the resin product. The Final Filter 307, preferably with a mesh size of approximately 45 microns, captures the resin product. The Final Filter 307 is removed and the resin is cleaned from it to be prepared for further processing.

Many modifications and variations of this invention may be made without departing from its spirit and scope, as will be appreciated by those skilled in the art. For example, the Multi-Tiered Filter Assembly 102 could contain several additional intermediate filters to facilitate the filtering process. The cleaning of the filters could also be automated by including space and controls for high pressure liquid sprays between each of the filters. Also, although water is specified herein as preferable, any suitable liquid could be used as the medium for the plant material. The specific embodiments described herein are offered by way of example only. The embodiments were chosen and described in order to best explain the principles of the invention and its practiced applications.

What is claimed is:

1. An apparatus for separating trichome heads containing resin from plants using liquid, the apparatus comprising:
   a basin comprising a D-shaped tub when viewed from above, a cover at a top of the basin, a bottom that is flat, a front portion that is semi-cylindrical along a vertical axis, a back portion that comprising a rounded box having two rounded corners extending in a vertical direction, a radial distance from a center of the semi-cylindrical front portion to a flat portion of the rounded box back portion is equal to or greater than a radius of the semi-cylindrical front portion;
   a rotator plate located inside and exclusively adjacent to the bottom of the basin, the rotator plate is circular, flat and has a vertical axis of rotation with a top surface comprising ribs extending vertically therefrom;
   a motor that is reversible and coupled to a bottom of the rotator plate, such that when the basin contains liquid and plant material and the rotator plate rotates, a double agitation is configured to form in the liquid comprising a first vortex about the vertical axis of rotation, and a second agitation adjacent to alternating ones of the two rounded corners of the basin, depending on a rotational direction of the rotator plate;
   a cart, the basin is mounted on top of the cart, the motor is vertically below the basin, and a filtering system extends out of and is located on a side of the cart below the basin; and
   a control panel configured to automatically control the apparatus and reverse a rotational direction of the rotator plate at selected intervals, and the control panel is configured to automatically increase a speed of the reversible motor during operation.

2. The apparatus of claim 1, further comprising:
   a drain in the flat bottom coupled to the filtering system comprising a valve and two or more removable filters in series such that, when the valve is opened and the liquid is drained from the basin, processed plant biomass and trichome heads containing resin are captured in the filters; and
   a cooling jacket on the basin configured to regulate a temperature of the liquid, and tops of the ribs on the rotator plate are located vertically below the cooling jacket.

3. The apparatus of claim 1, wherein the control panel is configured to automatically increase a speed of the reversible motor during operation, and the speed is in a range of 300 rpm to 1700 rpm.

* * * * *